Dec. 10, 1968 P. F. SENNA 3,414,935
FISH DRESSING TOOL
Filed Oct. 18, 1965
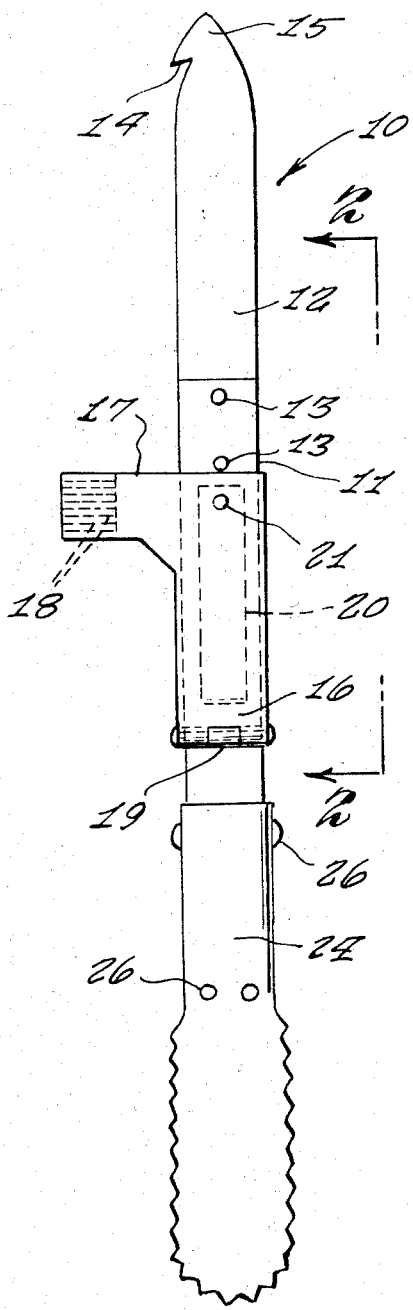
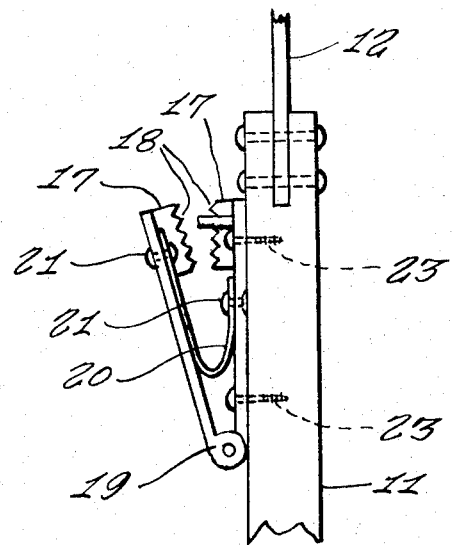
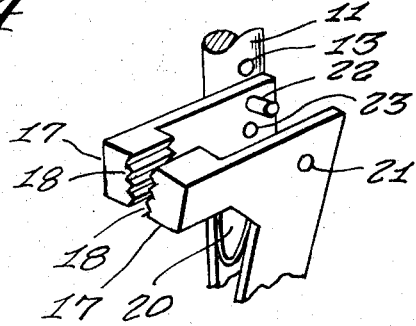
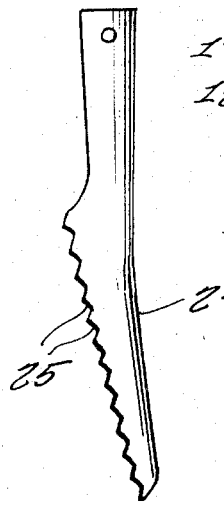
INVENTOR
PETER F. SENNA 3,414,935
FISH DRESSING TOOL
Peter F. Senna, R.F.D. 1, Williston, Vt. 05495
Filed Oct. 18, 1965, Ser. No. 496,916
1 Claim. (Cl. 17—7)

ABSTRACT OF THE DISCLOSURE

A tool for dressing fish, including a longitudinal wooden handle having a blade secured at one end thereof, a toothed scaler secured to the opposite end of the handle, and a pair of toothed jaws located alongside the handle for the purpose of gripping a fish.

---

This invention relates to combination tools, and more particularly to an all purpose tool for cleaning fish.

It is therefore the main purpose of this invention to provide a fish dressing tool which will incorporate all of the necessary elements that are needed for dressing fish.

Another object of this invention is to provide a fish dressing tool which will have a blade made of good cutlery steel which will have the area near the point of such construction so as to provide a means for easily ripping the skin of the fish. This portion of the device will be used for slitting the skin on each side of the fins of the fish in preparing the fins so that they may be pulled out.

Another object of this invention is to provide a fish dressing tool which will have spring loaded gripping jaws which will be used for pulling out the fins and the jaws will be attached to the knife handle element of the device, and a V-shaped spring in between the jaws thus springingly urges the jaws apart.

Still another object of this invention is to provide a fish dressing tool which will have a serrated edged scaler element on one end for the purpose of easily removing the scales from the fish.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 1 is a side view taken of this invention shown in elevation.

FIGURE 2 is a view taken along the lines 2—2 of FIGURE 1 and viewed in a direction indicated by the arrows.

FIGURE 3 is a fragmentary perspective view of the gripper member, and

FIGURE 4 is a side view of the scaler element.

According to this invention, a fish dressing tool 10 is provided with a wooden handle 11 which receives at one end a blade 12 which is secured to handle 11 by means of a plurality of rivets 13. Blade 12 is provided with a V-shaped notch 14 near the point 15 which provides a means for ripping the skin of fish. A gripper member 16 is provided with a pair of spring loaded jaws 17 having a plurality of teeth 18 which provides a means of gripping the fish fins in order to remove them from the fish. Gripper member 16 is provided with a hinge 19 which allows the jaws 17 to pivot open and closed. A non-corrosive spring 20 is secured to and within gripper member 16 by rivets 21, and a spacer pin 22 secured within gripper member 16 provides a means of reducing the stress upon the hinge 19. Gripper member 16 is secured to handle 11 by means of a pair of mounting screws 23. On the end of handle 11 of tool 10 opposite the blade 12 end a scaler element 24 having a plurality of teeth 25 is secured to handle 11 by means of a rivet 26 and thus provides a quick and efficient means for removing the scales from fish.

What I now claim is:

1. In a fish dressing tool, the combination of a handle having a flat blade secured to one end thereof, a notch on one side of said blade to form a hook for ripping open a fish, a scaler secured to the opposite end of said handle, and a gripper member secured to one side of said handle, said gripper comprising a pair of plates pivoted together at one end on a hinge, one of said plates being adjacent said side of the handle, said hinge extending transversely adjacent the handle whereby said plates extend along the longitudinal plane of said handle, and each said plate having a sideward extending portion comprising a jaw, said jaws being in alignment to engage each other and each jaw being toothed.

References Cited

UNITED STATES PATENTS

| 912,146 | 2/1909 | Moffett. | |
|---|---|---|---|
| 1,171,241 | 2/1916 | Potter | 17—7 |
| 1,424,722 | 8/1922 | Hartleb | 17—7 |
| 1,935,149 | 11/1933 | Elvin | 17—7 |
| 2,536,065 | 1/1951 | Kollander | 17—7 |

FOREIGN PATENTS 55,217   5/1935   Norway.

LUCIE H. LAUDENSLAGER, Primary Examiner.

U.S. Cl. X.R.

17—8